US008560813B2

(12) United States Patent
Webber

(10) Patent No.: US 8,560,813 B2
(45) Date of Patent: Oct. 15, 2013

(54) MULTITHREADED PROCESSOR WITH FAST AND SLOW PATHS PIPELINE ISSUING INSTRUCTIONS OF DIFFERING COMPLEXITY OF DIFFERENT INSTRUCTION SET AND AVOIDING COLLISION

(75) Inventor: Andrew David Webber, Hertfordshire (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 366 days.

(21) Appl. No.: 12/383,118

(22) Filed: Mar. 19, 2009

(65) Prior Publication Data

US 2009/0249037 A1 Oct. 1, 2009

(51) Int. Cl.
*G06F 9/38* (2006.01)
(52) U.S. Cl.
USPC ....... 712/219; 712/204; 712/216; 712/E9.045
(58) Field of Classification Search
None
See application file for complete search history.

(56) References Cited

U.S. PATENT DOCUMENTS

| | | | |
|---|---|---|---|
| 5,604,878 A * | 2/1997 | Colwell et al. | 712/217 |
| 5,884,057 A | 3/1999 | Blomgren et al. | |
| 5,948,098 A | 9/1999 | Leung et al. | |
| 5,968,167 A | 10/1999 | Whittaker et al. | |
| 7,366,877 B2 * | 4/2008 | Augsburg et al. | 712/214 |
| 7,478,225 B1 * | 1/2009 | Brooks et al. | 712/214 |
| 7,818,550 B2 * | 10/2010 | Vaden | 712/226 |
| 2006/0200651 A1 | 9/2006 | Collopy et al. | |

FOREIGN PATENT DOCUMENTS

| | | |
|---|---|---|
| WO | WO 97/38372 | 10/1997 |
| WO | WO 02/19098 A1 | 3/2002 |
| WO | WO 2006/094196 A2 | 9/2006 |

OTHER PUBLICATIONS

International Search Report dated Jun. 25, 2009 (3 pages).
Combined Search and Examination Report of UK Intellectual Property Office dated Jun. 5, 2008 (5 pages).
Peter M. Kogge: "The Architecture of Pipelined Computers", 1981, McGraw-Hill, N. York, Chapter 3: "Timing, Control, and Performance", pp. 69-115.
Dolle M et al: "A Cost-Effective RISC/DSP Microprocessor for Embedded Systems", IEEE Micro, IEEE Service Center, Los Alamitos, CA, vol. 15, No. 5, Oct. 1, 1995, pp. 32-40.

\* cited by examiner

*Primary Examiner* — Kenneth Kim
(74) *Attorney, Agent, or Firm* — Michael S. Garrabrants; ArtesynIP, Inc.

(57) ABSTRACT

A method and apparatus are provided for executing instructions from a plurality of instruction threads on a multithreaded processor. The instruction threads may each include instructions of different complexity. A plurality of pipelines for executing instructions are provided and an instruction scheduler determines on each clock cycle the pipelines upon which instructions will be executed. Some of the pipelines are configured to appear to the instruction threads as single pipelines but in fact include two pipeline paths, one for executed instructions of lower complexity and the other. The instruction scheduler determines on which of the two pipeline paths an instruction should execute.

13 Claims, 5 Drawing Sheets

Diverse pipeline

A multi-threaded microprocessor core

A microprocessor pipeline

High speed microprocessor pipeline

Diverse pipeline lengths

Pipeline conflict

Resolving pipeline conflict

Diverse pipeline

'Fast' pipeline

'Slow' pipeline

| Operation | Dest reg | Source 1 | Source 2 | 0 | Flags |
|---|---|---|---|---|---|
| Operation | Dest reg | Source 1 | Source 2 | 1 | DSP flags |

Instruction encoding ated Processor with Fast
MULTITHREADED PROCESSOR WITH FAST AND SLOW PATHS PIPELINE ISSUING INSTRUCTIONS OF DIFFERING COMPLEXITY OF DIFFERENT INSTRUCTION SET AND AVOIDING COLLISION

FIELD OF THE INVENTION

This invention relates to pipeline processors of the type which may be used to execute instructions from a plurality of instruction threads (pipelines), and in particular seeks to schedule instructions from pipelines to a microprocessor with a high clock speed while maintaining compatibility with an existing revision of that microprocessor by using multiple pipelines to provide the functionality previously provided by a single pipeline such that low latency may be maintained where possible.

BACKGROUND OF THE INVENTION

In the field of microprocessor implementation and development it is common practice to continually advance the capabilities of a microprocessor core by means of improvements to clock speed and/or performance. Clock speed may be improved by advanced silicon process technology where feature sizes on integrated circuits may be made smaller and smaller as implementation techniques improve. However, it is more likely that large improvements in clock speed will need an overhaul of the implementation of the logic of the device. Typically, in a microprocessor this will entail reorganising the processor's instruction pipeline such that an instruction takes more pipeline steps and each step has a shorter period than used on previous implementations of that microprocessor.

However, performance-per-cycle is likely to be somewhat impaired by the re-pipelining as a longer pipeline takes more cycles to complete the same task. To improve performance-per-cycle many advanced techniques may need to be employed such as predicting the outcome of certain operations—in particular predicting the outcome of instruction sequences that control the flow of the program (branches, jumps, calls, return etc.). Generally functions such as arithmetic have slightly lower performance relative to the previous implementations of a microprocessor, but the increase in top clock speed and the improvements in program flow improve the overall software performance more than the longer pipeline reduces it.

A multi-threaded microprocessor of the type discussed above is described in our British Patent No. GB2311882. This comprises a multithreaded processor, which may receive and execute instructions from a plurality of instruction pipelines. Scheduling logic which monitors the status of the various executing pipelines determines which pipeline's instructions should be executed on each clock cycle. Developments of this system improve the scheduling by monitoring more specific attributes of each instruction pipeline, such as time to complete execution, average execution rate for instructions etc.

However, these characteristics are not essential to embodiments of the present invention. One characteristic that is significant for embodiments of the present invention is that there is differentiation between different instruction sets such as Reduced instruction set computer (RISC) and digital signal processor (DSP) instruction sets in a single pipeline.

We have appreciated that it would be desirable to maintain current relative performance while increasing the clock speed limit for a microprocessor. In effect, to improve performance on two counts at once—one count is the clock speed, and the other is instructions per clock cycle.

SUMMARY OF THE INVENTION

Preferred embodiments of the present invention seek to provide multiple pipelines of differing lengths which appear to a programmer as being the same as a single pipeline from prior implementations of a corresponding microprocessor. This is achieved by means of providing multiple pipelines associated with a single arithmetic pipeline or ALU combined with intelligent instruction scheduling that routes instructions to the right pipeline based upon that instruction's requirements. In addition to this the instruction scheduler needs to correctly model the latency for a specific instruction given that it may vary depending upon which pipeline is used.

BRIEF DESCRIPTION OF THE DRAWINGS

A preferred embodiment of the invention will now be described in detail by way of example with reference to the accompanying drawings in which.

DETAILED DESCRIPTION

Figure 1:
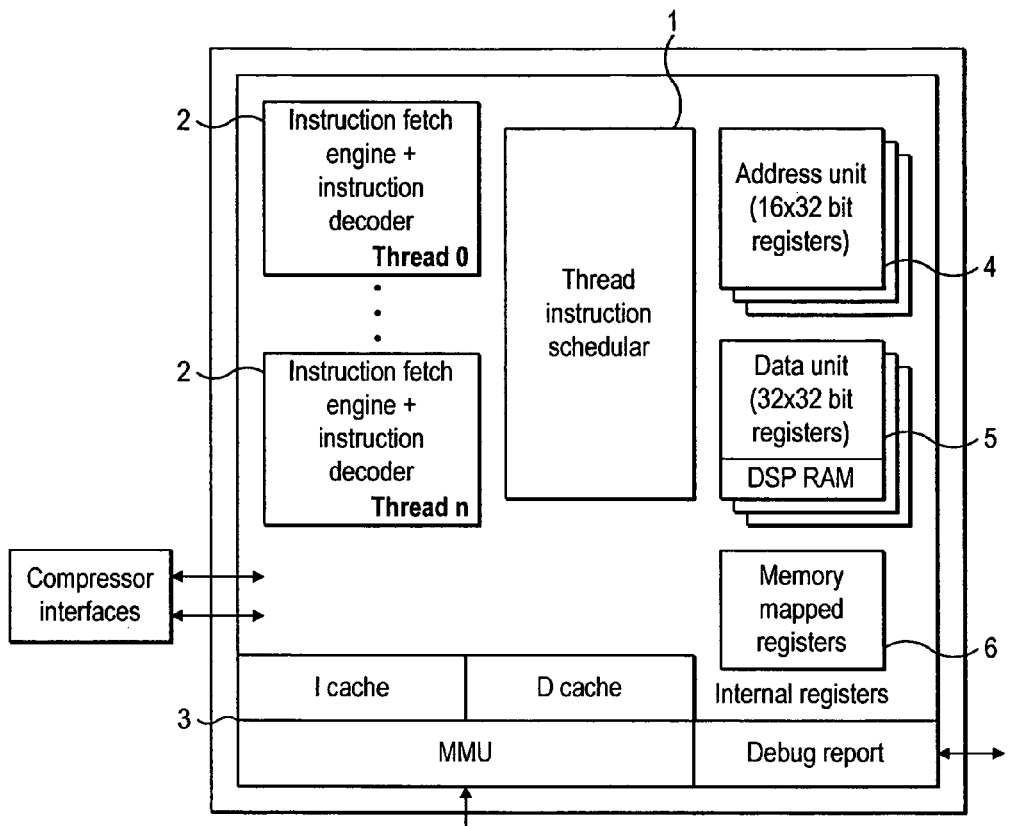
FIG. 1 is a block diagram of a multithreaded processor.

The multithreaded microprocessor described in our British Patent No. GB2311882 is of the type shown in FIG. 1. This processor has a total of N+1 executing threads shown at 2 which pass to a thread instruction scheduler 1 which determines which next instruction or instructions to provide for execution. In this example, there are two pipelines, firstly the address unit 4 and secondly the data unit 5. The microprocessor supports a number of different capabilities. Firstly, it can run system programs e.g. embedded software or operating systems as expected of a typical modem microprocessor. It may, however, also be geared to perform digital signal processing (DSP) activities. DSP is commonly employed when dealing with application areas such as radio, audio, and video where specific DSP algorithms are applied to data streams to turn them into useful end user information. It is usual that over their life span, microprocessors will be redesigned in order to achieve higher performance from either executing more processes per clock cycle or from executing more processor clock cycles per second (CPI or MIPS).

Embodiments of the present invention use more processor clock cycles per second. To achieve this, each individual clock cycle must take less time and it is therefore necessary to perform a pipeline task such as an arithmetic operation in less time. Sometimes this is possible because of a change in the silicon process used to fabricate a device (a process known as die shrink). It appears, however, also necessary to make improvements without changing the process.

One alternative to the process of die shrink is to use more pipeline stages to perform a given operation. For example, a pipeline that has 1 cycle allocated to perform an arithmetic operation could employ two cycles to perform the same operation so that each cycle could take half as long and therefore go twice as quickly. If such an approach is used, then the extra pipeline stages comprise additional latency in the pipeline which is visible to a software programmer. This means such that a program running on the microprocessor may need to wait for results to become available before using them in follow on operations. If a pipeline runs twice as fast the program needs to wait a cycle for a result, and the end result will be that the device has a much higher clock speed but does not actually perform any better than earlier generations of that microprocessor.

Common methods employed to balance these trade offs include super scalar execution and out of order completion. These techniques allow stalled instructions to be overtaken by unrelated instructions nearby. However, the down side of this approach is much greater complexity. A microprocessor of the type shown in FIG. 1 has two main aspects which need to be considered. Firstly, it can support general purpose software from embedded systems or operating systems such as LINUX. Secondly, it can support digital signal processing (DSP). At least as far as the arithmetic pipeline is concerned there is a difference in these two sets of functions. DSP functions add extra operations to those in the general purpose set. For example, a general purpose addition becomes a DSP addition by extending the function to incorporate the concepts of rounding and saturation (amongst others).

Embodiments of the invention take a pipeline which is able to perform all of these functions and duplicates the general purpose section without any DSP additional operations so that the general purpose pipeline can be kept shorter to avoid latency problems. Therefore, a microprocessor which previously had a single pipeline with general purpose software and DSP functions now has two pipelines, one for performing only the general purpose software functions and the other for performing general purpose software functions and DSP functions. These two pipelines can then be used for different purposes i.e. general purpose functionality and DSP functionality. This enables the majority of instructions used to run an application and/or the operating system to be run at a higher dock speed without increasing the latency. At the same time, DSP code can be run and will perform as previously. It will however have the potential for stalling more frequently if it is dependent on data from the other pipeline.

A block diagram of a microprocessor of the type, which may embody the present invention, is shown in FIG. 1 as discussed above. This comprises instruction fetch engines and instruction decoders 2, which provide instructions to a thread instruction scheduler. Instructions may be retrieved from an instruction cache 3 or from on chip RAM. Examples of pipelines in this figure are the address unit 4 and the data unit 5. Other possibilities exist.

Figure 2:
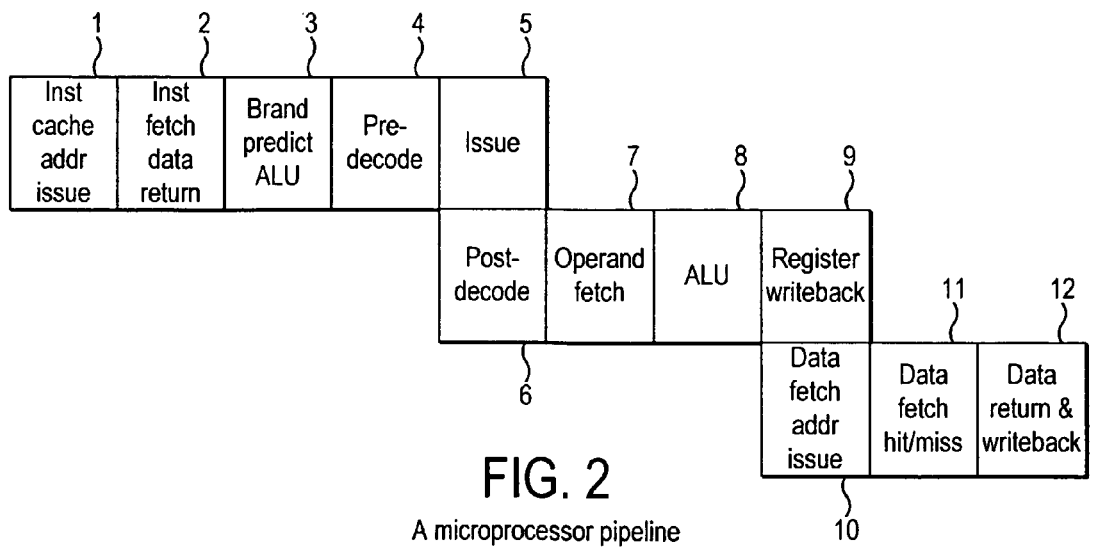
FIG. 2 is a diagram showing the steps on each clock cycle of an executing thread.

FIG. 2 shows the main functions of an instruction pipeline which is contained within one clock cycle. This is the ALU cycle. A pipeline such as this may support a number of different instruction types, in particular it may be concerned with running general purpose operating system codes or DSP functions. Being able to support and differentiate between DSP and non DSP programs within a single processor is known within the field of microprocessor design.

In FIG. 2, each box represents a clock cycle. The steps performed on each clock cycle are as follows:

1. Instruction cache address issue, which sends an address to the instruction cache to retrieve an instruction.
2. Instruction fetch data return in which the fetched instruction is returned.
3. Branch predict ALU, in which a prediction is made as to whether or not the instruction will require a branch to be performed by the ALU.
4. Pre-decode in which the instruction goes through a pre-decode stage.
5. Issue, in which the instruction is issued.
6. Post decode in which the instruction goes through its post decode phase concurrently with instruction issue.
7. Operand fetch in which the data on which the instruction is to operate is retrieved.
8. ALU in which the instruction executes on the operand in the ALU.
9. Register write back in which the output of the ALU is written back to the appropriate register.
10. Data fetch address issue.
11. Data fetch hit/miss.
12. Data return and write back.

Steps 10, 11, and 12 are steps which are a integral part of a processor since they provide access to a data cache or data memory.

If such a microprocessor is based around a reduced instruction set computer (RISC) then DSP instructions can be considered to be extensions beyond the basic instruction set. It is most common for these extensions only to be applicable in certain areas. Typical areas include multiplication and other arithmetic where DSP requires additional capabilities such as saturation and rounding.

In a preferred embodiment of the present invention, as the clock speed ceiling is raised, the microprocessor cycle time becomes smaller. There is therefore progressively less time to perform the functions required in each cycle. For the main arithmetic operations such as addition, subtraction, shifts, multiplications etc the DSP variants of these operations will be under more time pressure than the none DSP variants. This is because the DSP variants have additional steps on top of the none-DSP functionality.

In order to ensure that it is possible to increase the top speed of the microprocessor beyond that of previous implementations, it is necessary to re-pipeline the design so that there are more cycles with each cycle taking less time. An example of the re-pipelining of the pipeline of FIG. 2 is shown in FIG. 3.

As can be seen, an increase in the ceiling of the clock speed can be achieved by using additional cycles to complete parts of the pipeline. For example, in FIG. 1 instruction cache look up takes two cycles (1 and 2), but in FIG. 2 it takes four cycles (13, 14, 15, and 16). These additional cycles are required because less is performed in each individual cycle. Therefore, as the time for a cycle needs to be shorter for the device to clock at higher speeds the same quantity of work needs to be spread over a larger number of cycles.

Figure 3:
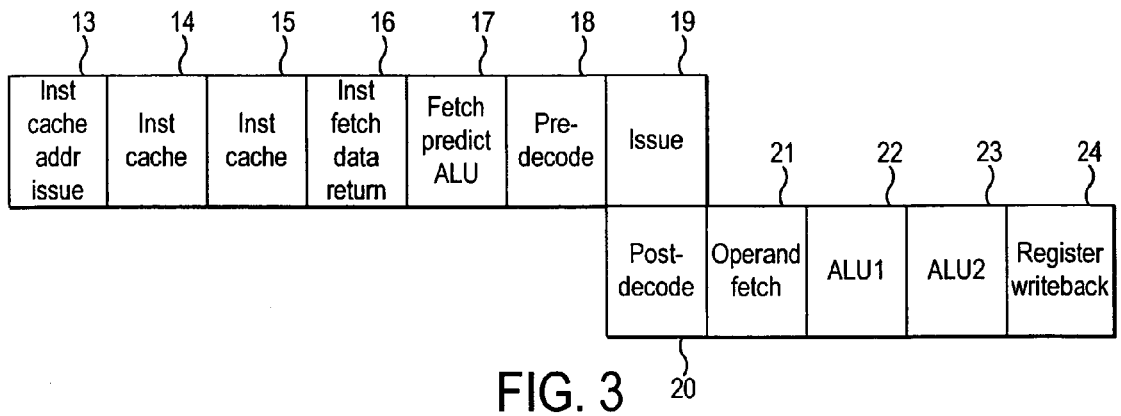
FIG. 3 is a modification of FIG. 2 showing the effect of a shorter clock cycle.

In FIG. 3, the additional steps are labelled 14 and 15 and comprise the additional time required to retrieve instructions to be issued from the instruction cache. This additional time is the result of the shortened cycle period.

Step 17 is fetch predict ALU. This includes branch and return prediction relating to the instructions and is a well-known process.

Step 18, Pre-decode strips an instruction to its requirements including DSP or non DSP characterises and uses this to determine which pipeline path will be used. A flag is output from the pre-decode step indicating whether the fast or slow pipeline path is to be used. This has no impact on the issue of an instruction, but does on future issues because the unit is either busy when an instruction issue is required, or the register being written to will have a longer read or write after write (i.e. register hazards). Therefore it is only for these arithmetic units that the slow path flag and variable future scheduling hazards are applied in this particular embodiment.

Steps 22 and 23 are labelled ALU1 and ALU2 and are the additional timing the ALU requires to execute the instruction because of the reduced cycle period.

The main advantage of this re-pipelining exercise is that the device can achieve more cycles per second. If an instruction can be started on each cycle this would directly lead to more instructions per second. However, there is a disadvantage in that if an instruction must wait for a prior instruction to complete (e.g. to utilise its result) it will need to wait for more cycles after re-pipelining. This additional waiting time can counteract the increase in speed obtained by shorter cycle periods such that a microprocessor could end up pursuing the same number of instructions per second.

Preferred embodiments of the invention separate out easily performed instructions from more difficult to perform instructions. The ones which are easier to perform are then attempted to be executed with the same latency as in prior implementations of the microprocessor. To achieve this, the arithmetic pipeline is replicated for a set of critical functions such that there exists a fast path for low latency easier to complete instructions and a slow path for more complex instructions such as DSP instructions. In addition, the instruction scheduling requires changes to route the relevant instructions to the required fast or slow pipeline, and to track the registers in flight such that it can be accurately determined when a follow on instruction may be issued. Meanwhile, as far as the programmer producing instructions to run when the microprocessor is concerned, it appears that there is a single pipeline of the same form as previous implementations of the device.

Figure 4:
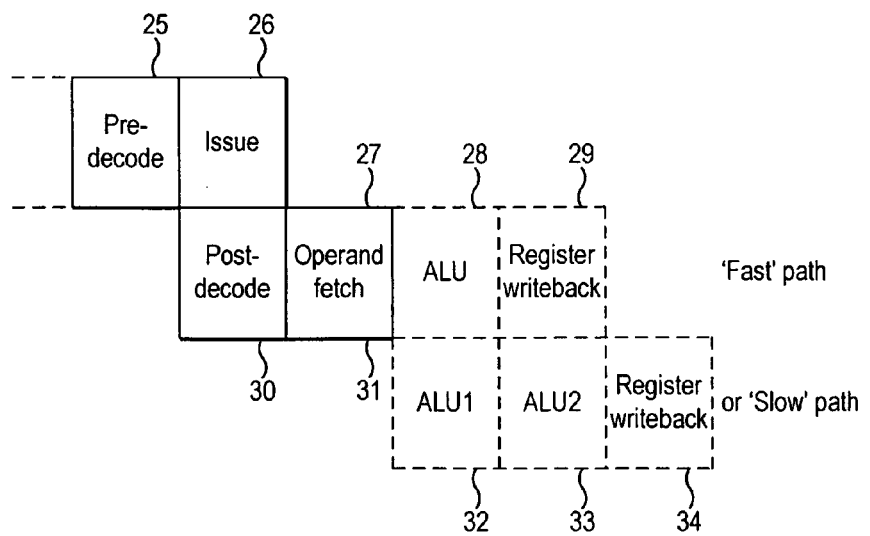
FIG. 4 shows the steps for two separate paths through the same thread.
Figure 5:
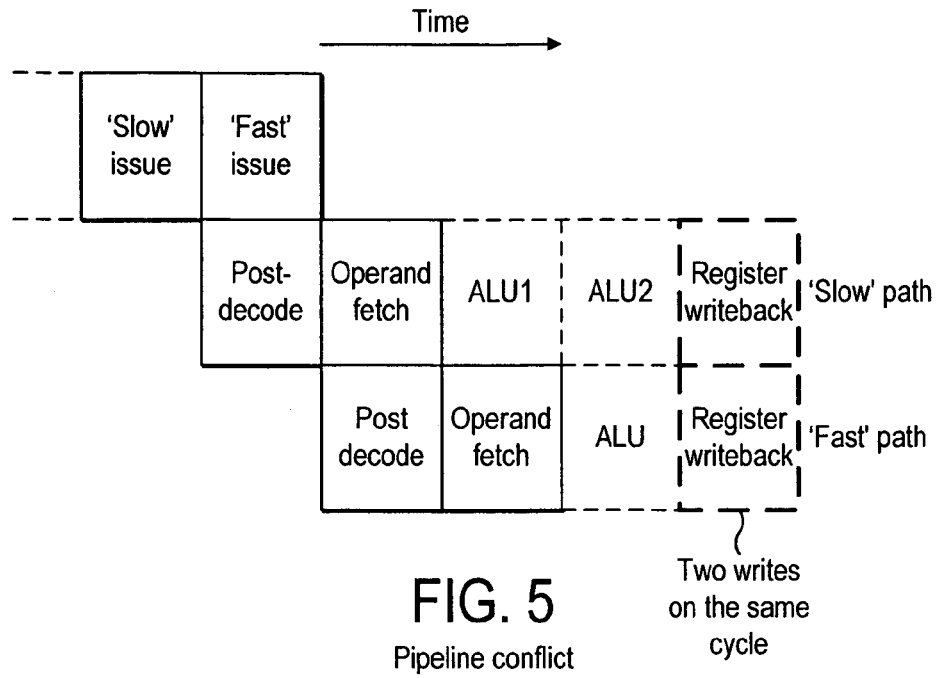
FIG. 5 shows the problems which may arise with incorrect scheduling of instructions through two paths on the same thread.

The important parts of this arrangement are shown in FIG. 4. As far as the program is concerned the processor appears to have the same pipelines as were present in earlier implementations. However, in accordance with the embodiment of the invention changes in the scheduling of instructions are made such that one or more threads employs a pair of pipelines with sufficient coherency that these pipelines do not clash. Hazards exist because the two pipelines have different latency. In the example of FIG. 4, the faster pipeline has one ALU cycle 28 while the third pipeline has two ALU cycles 32 and 33. If, therefore, an instruction issue is made down the slower pipeline then it may not be possible for an instruction issue to be made down the faster pipeline on the next cycle. This is because the two pipelines would end up finishing on the same cycle as shown in FIG. 5, and there would be a data clash.

Figure 6:
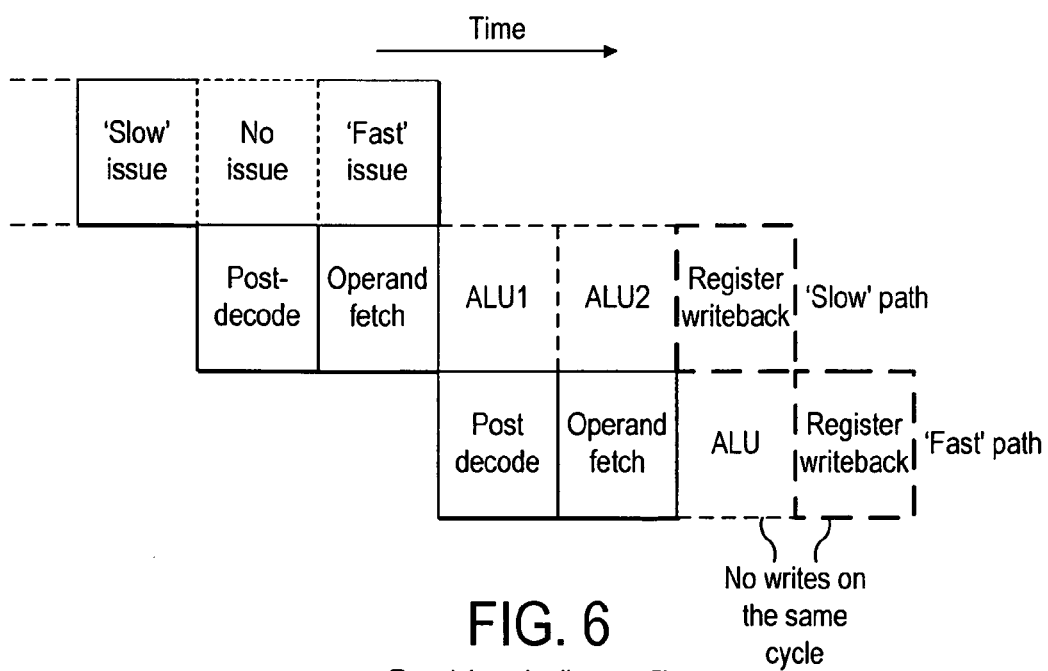
FIG. 6 shows a correctly scheduled version of FIG. 5.

In order to resolve this problem, the instruction scheduler can be programmed such that it can refuse to issue an instruction if it determines that this dash would be triggered. For example, it can be programmed to not issue the second instruction until it determines that this can be executed without generating the conflict between the slow path and fast path. This is shown in FIG. 6. As can be seen, the first instruction issues two cycles after the slow instructions. However, it executes one cycle quicker than the slow instruction and therefore completes execution one cycle after the slow instruction.

The instruction scheduler is therefore programmed to track when a slow pipeline instruction has just been issued so that it may prevent issuing an instruction to the corresponding fast pipeline on the next cycle. This is done by maintaining a data record for each pipeline that records the last action performed on the pipeline. This can then be used to determine the next action allowed to the same pipeline. This part of the instruction scheduler applies to all of the threads and so is controlled on per-pipeline basis rather than a per-thread basis.

Each executing thread of instructions needs to determine whether an instruction may be issued on a cycle. This is dependent upon whether that thread has dependencies upon instructions that were issued in the past. For example, an instruction may load a register from memory and be followed by an arithmetic operation on that register. It is therefore necessary for the thread to monitor the dependencies between old instructions and new ones to determine if the result from an old instruction is required by a new one. Register interlocks maintain a record of operations which are still in progress, and the change from one pipeline to two where one is slower than the other affects these register interlocks. Instructions sent to a slow pipeline may require extra interlocks compared to those sent down a fast pipeline. These extra hazards occur because it takes more cycle instructions to pass down the slow pipeline and return the result to the registers. As with pipeline interlocks, these hazards and interlocks are managed by recording when instructions have been issued into the slow pipeline and using this information to determine when another instruction may be issued. External factors such as other threads winning access to pipelines may prevent the thread from issuing on that cycle, but at least the thread knows when it is safe to issue an instruction or not and may therefore signal that it may issue or not to the main multithreaded instruction scheduler.

Figure 7:
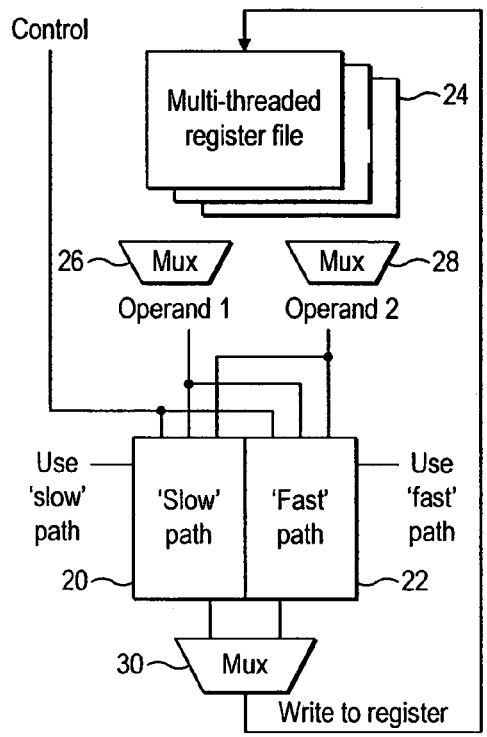
FIG. 7 is a block diagram of a thread with two pipelines.

FIG. 7 shows hardware embodying the fast and slow pipelines with some additional infrastructure. This comprises a slow path and a fast path through pipelines, 20 and 22 respectively. Register files 24 are held for each thread. These are grouped together in a register array with a separate set of registers held for each thread in the multithreaded processor. Data from the multithreaded register files are selected to provide data to slow or fast paths 22 and 24 via multiplexers 26 and 28. The outputs from these multiplexers may be provided to either the slow path or the fast path. A control signal is also provided to each path along with a signal indicating, "use slow path" or "use fast path". After processing by either the slow path or the fast path, a further multiplexer 30 selects the output to write back to the respective register file or files. For example, to be able add or subtract a pair of numbers it is necessary to look up pairs of registers so that two ends are fetched on each cycle. As can be seen, a control signal needs to be sent to the two pipelines. This is a common signal, as only one pipeline will be used on any given cycle. This control signal is therefore common to both pipelines.

However, as each pipeline is to execute independently a separate control signal (USE SLOW PATH:USE FAST PATH) is provided for each one to control which is active. These controls are mutually exclusive as only one pipeline may be in operation on the specific cycle.

Figure 8:
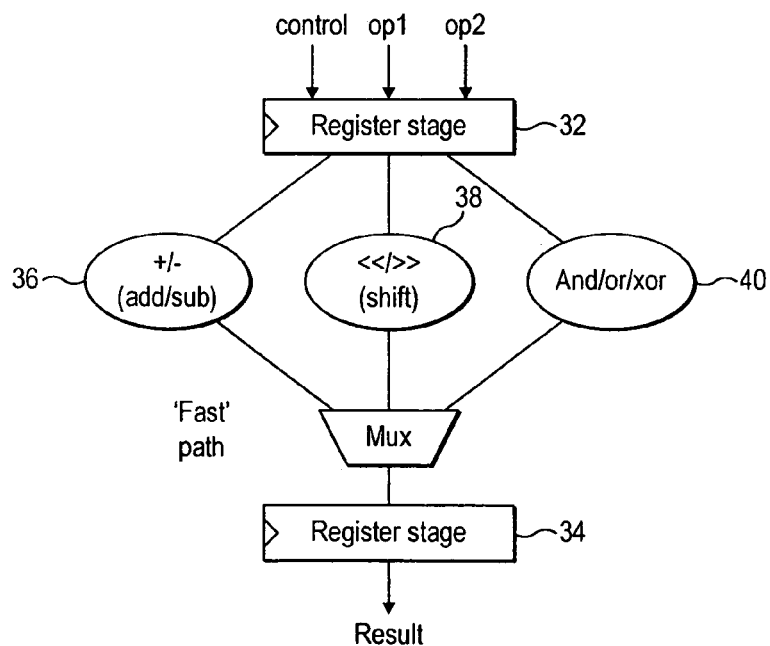
FIG. 8 is a block diagram of a fast pipeline.

It should be noted that it is necessary to multiplex the outputs from the two pipelines with multiplexer 30 to present a unified single write back to the register file on each cycle. Generally speaking, the fast pipeline is a subset of a slow pipeline. An example of a fast pipeline is shown in FIG. 8. This shows the principle features of an arithmetic pipeline. These are pipeline register stages 32 and 34 to control the flow of information over time, arithmetic functions such as addition 36, subtraction 38, shifts and logical operations 40, and a multiplexing unit 42 to be used to merge the assorted possible arithmetic functions into a single result.

Figures 9, 10:
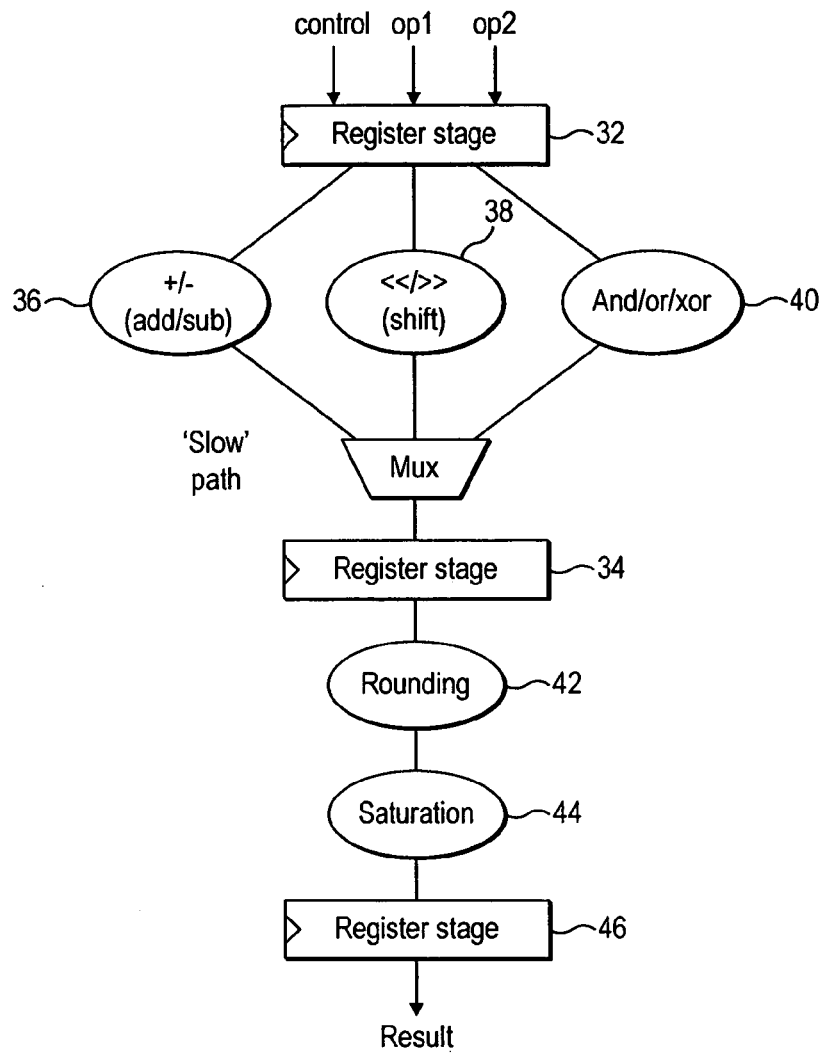
FIG. 9 is a block diagram of a slow pipeline.
FIG. 10 illustrates the instruction encoding for instruction scheduler.

The slow path follows a similar form which is shown in FIG. 9. As can be seen from this, the structure of the fast and slow pipelines are fundamentally the same. The principle difference is that the slow pipeline takes an extra pipeline stage in order to perform the work. In this example the extra work being performed is DSP arithmetic comprising ROUNDING 42 and SATURATION 44. This may require other materials from other pipelines. For example, memory generators may have modular addressing functionality associated with them for DSP purposes. A further register 46 is provided at the end of the slow path.

For the instruction scheduler to determine the correct routing for each instruction it requires some means to differentiate between types of instruction. This is achieved with a relatively straightforward method in a single instruction which is used to differentiate instructions of the same general form as those shown in FIG. 10.

As can been seen from this figure, instructions contain similar information. The main difference arises from a single bit which makes an instruction a DSP instruction or not. Flags control certain aspects of what an instruction is doing. For Example a flag could be used to designate that one of the operands is a zero as opposed to data from a register.

Complex methods for differentiating between each instructions may be used. If this is the case it may be necessary for additional decode stages before the pre-decoding stage in FIG. 2 or 3. The extra work can be achieved without effecting the clock speed of the instruction decoder stages. Providing a determination has been made in advance and the instruction has been presented to the instruction scheduler, all manner of levels of instruction complexity are possible.

The invention claimed is:

1. A multithreaded processor for executing instructions from a plurality of instruction threads which may each include instructions of differing complexity, comprising:
a plurality of pipelines for executing the instructions of differing complexity from the instruction threads in parallel, wherein the instructions of differing complexity comprise instructions from different instruction set architectures; and
an instruction scheduler for issuing instructions and determining on each clock cycle which instructions are issued to the pipelines,
wherein at least one pipeline comprises two pipeline paths, a fast path with a lower latency for executing instructions of a lower complexity and a slow path for executing instructions of a higher complexity and
the instruction scheduler is configured to determine on which of the two pipeline paths issued instructions should execute and
schedule the issued instructions on the two pipeline paths to avoid a data clash by maintaining a data record for the pipeline that records actions performed on that pipeline and using the data record for that pipeline to track when a higher complexity instruction has been issued and preventing issuing a lower complexity instruction to the corresponding lower complexity pipeline so that the higher and lower complexity instructions complete execution on different clock cycles.

2. The multithreaded processor according to claim 1, wherein one of the instruction sets is a digital signal processing (DSP) instruction set.

3. The multithreaded processor according to claim 1, wherein one of the instruction sets is a reduced instruction set computer (RISC) set.

4. The multithreaded processor according to claim 1, wherein the two paths execute instructions with a common clock signal.

5. The multithreaded processor according to claim 1, wherein the instructions have a flag associated with them indicating whether or not the instructions are of greater complexity, and the multithreaded processor includes means for detecting the flag associated with an instruction and means for determining on which path the instruction should be executed in dependence on the detected flag.

6. The multithreaded processor according to claim 1, wherein the instructions may be executed on the two pipeline paths simultaneously.

7. A method of executing instructions from a plurality of instruction threads which may each include instructions of differing complexity, comprising:
providing a plurality of pipelines for executing the instructions of differing complexity from the instruction threads in parallel, the instructions of differing complexity comprising instructions from different instruction set architectures;
determining in an instruction scheduler on which pipeline the instructions will be executed on each clock cycle, at least some of the pipelines comprising two pipeline paths, a fast path with a lower latency and a slow path;
executing instructions of a lower complexity on the fast path and instructions of a higher complexity on the slow path; and
determining in the instruction scheduler on which of the two paths an instruction should be executed,
wherein issued instructions are scheduled on the two pipeline paths to avoid a data clash by maintaining a data record for the pipeline that records actions performed on that pipeline and using the data record for that pipeline to truck when a higher complexity instruction has been issued and preventing issuing a lower complexity instruction to the corresponding lower complexity pipeline so that the higher and lower complexity instructions complete execution on different clock cycles.

8. The method according to claim 7, wherein one of the instruction sets is a digital signal processing (DSP) instruction set.

9. The method according to claim 7, wherein one of the instruction sets is a reduced instruction set computer (RISC) set.

10. The method according to claim 7 including the step of clocking the two paths with a common clock signal.

11. The method according to claim 7 including the steps of associating a flag with each instruction indicating whether or not the instruction is of greater complexity, and detecting the flag associated with an instruction and determining on which path the instruction should be executed in dependence on the detected flag.

12. The method according to claim 7 including the step of executing the instructions on the two pipeline paths simultaneously.

13. The method according to claim 12 including the step of scheduling the instructions on the two pipeline paths such that the instructions are executed on different clock cycle.

* * * * *